US012697992B2

(12) United States Patent　　(10) Patent No.:　US 12,697,992 B2
Lott et al.　　(45) Date of Patent:　　Aug. 4, 2026

(54) AUTOMATED DRIVING SYSTEM WITH INTEGRATED HANDS-ON AND HANDS-OFF MODES

(71) Applicant: GM GLOBAL TECHNOLOGY OPERATIONS LLC, Detroit, MI (US)

(72) Inventors: Zachary Lott, Rochester Hills, MI (US); Reza Zarringhalam, Whitby (CA); Milad Jalaliyazdi, Richmond Hill (CA); Alexander Gene Rath, Fenton, MI (US); Mariana Correa, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 18/824,069

(22) Filed: Sep. 4, 2024

(65) Prior Publication Data

US 2026/0062029 A1　　Mar. 5, 2026

(51) Int. Cl.
　　*B60W 50/16*　　(2020.01)
　　*B60K 35/28*　　(2024.01)
　　(Continued)

(52) U.S. Cl.
　　CPC ............. *B60W 50/16* (2013.01); *B60K 35/28* (2024.01); *B60W 30/182* (2013.01);
　　(Continued)

(58) Field of Classification Search
　　CPC ............. B60W 50/16; B60W 60/0059; B60W 30/182; B60W 50/082; B60W 2540/215;
　　(Continued)

(56) References Cited

U.S. PATENT DOCUMENTS 9,772,626 B2　　9/2017　Bendewald et al.
2014/0095212 A1*　4/2014　Gloerstad .............. G06Q 40/08
　　　　　　　　　　　　　　　705/4

(Continued)

FOREIGN PATENT DOCUMENTS

CN　　110178107 B　*　2/2023　............. G06F 3/044
CN　　117208008 A　*　12/2023

(Continued)

OTHER PUBLICATIONS

German Office Action for German Application No. 102024131717.5; dated May 6, 2025; 11 pages.

*Primary Examiner* — Chico A Foxx
(74) *Attorney, Agent, or Firm* — CANTOR COLBURN LLP

(57)　　　　　ABSTRACT

An automated driving system integrates hands-on and hands-off operational modes for vehicles. The system receives a request from a driver to enable the automated driving system, determines the availability of an adaptive cruise control system, and activates the adaptive cruise control system if available. The system monitors the vehicle's location to determine if the vehicle is on a mapped road. If the vehicle is on a mapped road, the system displays an indication to the driver and operates in a hands-off mode. If the vehicle is not on a mapped road, the system displays an indication to the driver and operates in a hands-on mode. The system also monitors the driver's hand position on the steering wheel and provides feedback accordingly. Additionally, the system includes features for monitoring driver attentiveness and transitioning between operational modes based on road conditions and sensor data.

20 Claims, 6 Drawing Sheets

(51) Int. Cl.

| | |
|---|---|
| *B60W 30/182* | (2020.01) |
| *B60W 50/08* | (2020.01) |
| *B60W 50/14* | (2020.01) |
| *B60W 60/00* | (2020.01) |

(52) U.S. Cl.
CPC ...... *B60W 50/082* (2013.01); *B60W 60/0059* (2020.02); *B60K 2360/119* (2024.01); *B60K 2360/171* (2024.01); *B60K 2360/172* (2024.01); *B60W 2050/146* (2013.01); *B60W 2540/215* (2020.02); *B60W 2540/223* (2020.02); *B60W 2556/10* (2020.02); *B60W 2556/40* (2020.02)

(58) Field of Classification Search
CPC ......... B60W 2556/10; B60W 2556/40; B60W 2540/223; B60W 2050/146; B60K 35/28; B60K 2360/171; B60K 2360/172; B60K 2360/119

See application file for complete search history.

(56) References Cited

U.S. PATENT DOCUMENTS

| | | | | |
|---|---|---|---|---|
| 2016/0209841 | A1* | 7/2016 | Yamaoka | .............. B60W 30/00 |
| 2016/0231743 | A1* | 8/2016 | Bendewald | ........... B60K 35/60 |

| | | | | |
|---|---|---|---|---|
| 2018/0061242 | A1* | 3/2018 | Bavar | .................... G08G 1/202 |
| 2018/0239352 | A1* | 8/2018 | Wang | .................. B60W 50/14 |
| 2019/0278267 | A1* | 9/2019 | Honda | ............... B60W 60/005 |
| 2020/0307691 | A1* | 10/2020 | Kalabic | ............. B62D 15/0255 |
| 2021/0163017 | A1* | 6/2021 | Fredman | .............. B60W 50/04 |
| 2021/0304598 | A1* | 9/2021 | Hata | ........................ G06F 18/22 |
| 2022/0101444 | A1* | 3/2022 | Kamimurai | ............ G08G 1/166 |
| 2023/0092515 | A1* | 3/2023 | Cheon | .............. B60W 60/0053 |
| | | | | 701/1 |
| 2023/0219593 | A1 | 7/2023 | Pruksch et al. | |
| 2023/0242138 | A1* | 8/2023 | Choi | .................... B60W 40/10 |
| | | | | 701/117 |
| 2023/0391378 | A1* | 12/2023 | Hattori | ................ B62D 15/021 |
| 2024/0190455 | A1 | 6/2024 | Zarringhalam et al. | |

FOREIGN PATENT DOCUMENTS

| | | | | | |
|---|---|---|---|---|---|
| DE | 102015207025 | A1 | * | 10/2016 | ........ B62D 15/0265 |
| DE | 102018218843 | A1 | * | 5/2019 | ........ G01C 21/3635 |
| DE | 102022205146 | A1 | | 11/2023 | |
| EP | 3336643 | B1 | * | 12/2020 | ....... B60W 60/0053 |
| EP | 3915852 | A1 | * | 12/2021 | ......... B60W 50/085 |
| GB | 2563902 | A | * | 1/2019 | ....... B60W 60/0057 |
| GB | 2563903 | A | * | 1/2019 | ....... B60W 60/0057 |
| KR | 20230143012 | A | * | 10/2023 | ......... G01M 17/007 |
| WO | WO-2022244548 | A1 | * | 11/2022 | .............. G08G 1/16 |
| WO | WO-2024118182 | A1 | * | 6/2024 | ........... B62D 15/025 |

* cited by examiner

AUTOMATED DRIVING SYSTEM WITH INTEGRATED HANDS-ON AND HANDS-OFF MODES

BACKGROUND

The subject disclosure relates generally to automated driving systems, and more specifically to systems that integrate hands-on and hands-off operational modes for vehicles.

Modern transportation technologies have introduced advanced features aimed at enhancing driving safety and convenience. These features assist or take over certain driving tasks, offering functionalities such as lane keep assist, adaptive cruise control, and fully autonomous operation. Despite these advancements, user confusion regarding the operation and conditions for utilizing these features limits their adoption and effective use.

Current systems often operate with distinct operational requirements and limitations. Some systems rely on high-definition maps and geofencing to ensure safe operation, while others depend on real-time data inputs to maintain lane positioning. The lack of integration between these operational modes can lead to user uncertainty and reduced system usability, particularly when transitioning between different driving environments.

SUMMARY

According to one aspect of the present invention, a method for operating an automated driving system of a vehicle includes receiving a request from a driver of the vehicle to enable the automated driving system; determining if an adaptive cruise control system is available and, if so, activating the adaptive cruise control system; determining if the vehicle is located on a mapped road and, if so, displaying an indication to the driver of a transition to a hands-off operating mode of the automated driving system and operating the automated driving system in the hands-off operating mode; and if the vehicle is not located on a mapped road, displaying an indication to the driver of a transition to a hands-on operating mode of the automated driving system and operating the automated driving system in the hands-on operating mode.

According to another aspect, the method further includes placing the automated driving system in a standby mode and displaying an indication of standby mode to the driver if the adaptive cruise control system is not available.

According to yet another aspect, the method further includes monitoring the position of one or more hands of the driver while in the hands-off operating mode and, if after a certain period of time, the one or more hands of the driver are detected on the steering wheel, providing a message to the driver that it is safe to operate the vehicle in a hands-off manner.

According to another aspect, the method further includes monitoring the position of one or more hands of the driver while in the hands-off operating mode and, if the one or more hands of the driver are detected on the steering wheel, vibrating the steering wheel.

According to yet another aspect, the method further includes monitoring the location of the vehicle while in the hands-on operating mode and, if the vehicle transitions to a mapped road, displaying an indication to the driver of the transition to the hands-off operating mode of the automated driving system and operating the automated driving system in the hands-off operating mode.

According to another aspect, the method further includes monitoring the location of the vehicle while in the hands-off operating mode and, if the vehicle transitions to an unmapped road, displaying an indication to the driver of the transition to the hands-on operating mode of the automated driving system and operating the automated driving system in the hands-on operating mode.

According to yet another aspect, the indication to the driver of the transition from the hands-off operating mode to the hands-on operating mode includes displaying a red icon of a steering wheel with hands disposed on the steering wheel.

According to another aspect, the indication to the driver of the transition to the hands-off operating mode includes displaying an icon of a steering wheel without hands disposed on the steering wheel.

According to yet another aspect, the indication to the driver of the transition to the hands-on operating mode includes displaying an icon of a steering wheel with hands disposed on the steering wheel.

According to another aspect, the method further includes displaying to the driver of the vehicle an icon that indicates the operating mode of the automated driving system.

According to yet another aspect, the method further includes monitoring the attentiveness of the driver while the automated driving system is in one of the hands-off operation mode and the hands-on operating mode; if the level of attentiveness of the driver is less than a threshold level, displaying a request for the driver to take control of the vehicle; if the level of attentiveness of the driver increases above the threshold level during a specified time period after displaying the request for the driver to take control of the vehicle, allowing the vehicle to continue operation in one of the hands-off operation mode and the hands-on operating mode; and if the level of attentiveness of the driver does not increase above the threshold level during the specified time period after displaying the request for the driver to take control of the vehicle, disabling the automated driving system for the remainder of a key cycle of the vehicle.

According to another aspect, a vehicle includes an automated driving controller configured to receive a request from a driver of the vehicle to enable an automated driving system; determine if an adaptive cruise control system is available and, if so, activate the adaptive cruise control system; determine if the vehicle is located on a mapped road and, if so, display an indication to the driver of a transition to a hands-off operating mode of the automated driving system and operate the automated driving system in the hands-off operating mode; and if the vehicle is not located on a mapped road, display an indication to the driver of a transition to a hands-on operating mode of the automated driving system and operate the automated driving system in the hands-on operating mode.

According to yet another aspect, the automated driving controller is further configured to place the automated driving system in a standby mode and display an indication of standby mode to the driver if the adaptive cruise control system is not available.

According to another aspect, the automated driving controller is further configured to monitor the position of one or more hands of the driver while in the hands-off operating mode and, if after a certain period of time the one or more hands of the driver are detected on the steering wheel, display a message to the driver that it is safe to operate the vehicle in a hands-off manner.

According to yet another aspect, the automated driving controller is further configured to monitor the position of one or more hands of the driver while in the hands-off operating mode and, if after a certain period of time the one or more hands of the driver are detected on the steering wheel, vibrate the steering wheel.

According to another aspect, the automated driving controller is further configured to monitor the location of the vehicle while in the hands-on operating mode and, if the vehicle transitions to a mapped road, display an indication to the driver of the transition to the hands-off operating mode of the automated driving system and operate the automated driving system in the hands-off operating mode.

According to yet another aspect, the automated driving controller is further configured to monitor the location of the vehicle while in the hands-off operating mode and, if the vehicle transitions to an unmapped road, display an indication to the driver of the transition to the hands-on operating mode of the automated driving system and operate the automated driving system in the hands-on operating mode.

According to another aspect, the indication to the driver of the transition from the hands-off operating mode to the hands-on operating mode includes displaying a red icon of a steering wheel with hands disposed on the steering wheel.

According to yet another aspect, the indication to the driver of the transition to the hands-off operating mode includes displaying an icon of a steering wheel without hands disposed on the steering wheel.

According to another aspect of the present invention, a method for operating an automated driving system of a vehicle includes receiving a request from a driver of the vehicle to enable the automated driving system; monitoring the location of the vehicle to determine whether the vehicle is on a mapped road or an unmapped road; monitoring the state of an adaptive cruise control system of the vehicle; if the vehicle is located on the mapped road and the adaptive cruise control system of the vehicle is active, operating the automated driving system in a hands-off operating mode; and if the vehicle is located on the unmapped road and the adaptive cruise control system of the vehicle is active, operating the automated driving system in a hands-on operating mode.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings.

DETAILED DESCRIPTION

Figure 1:
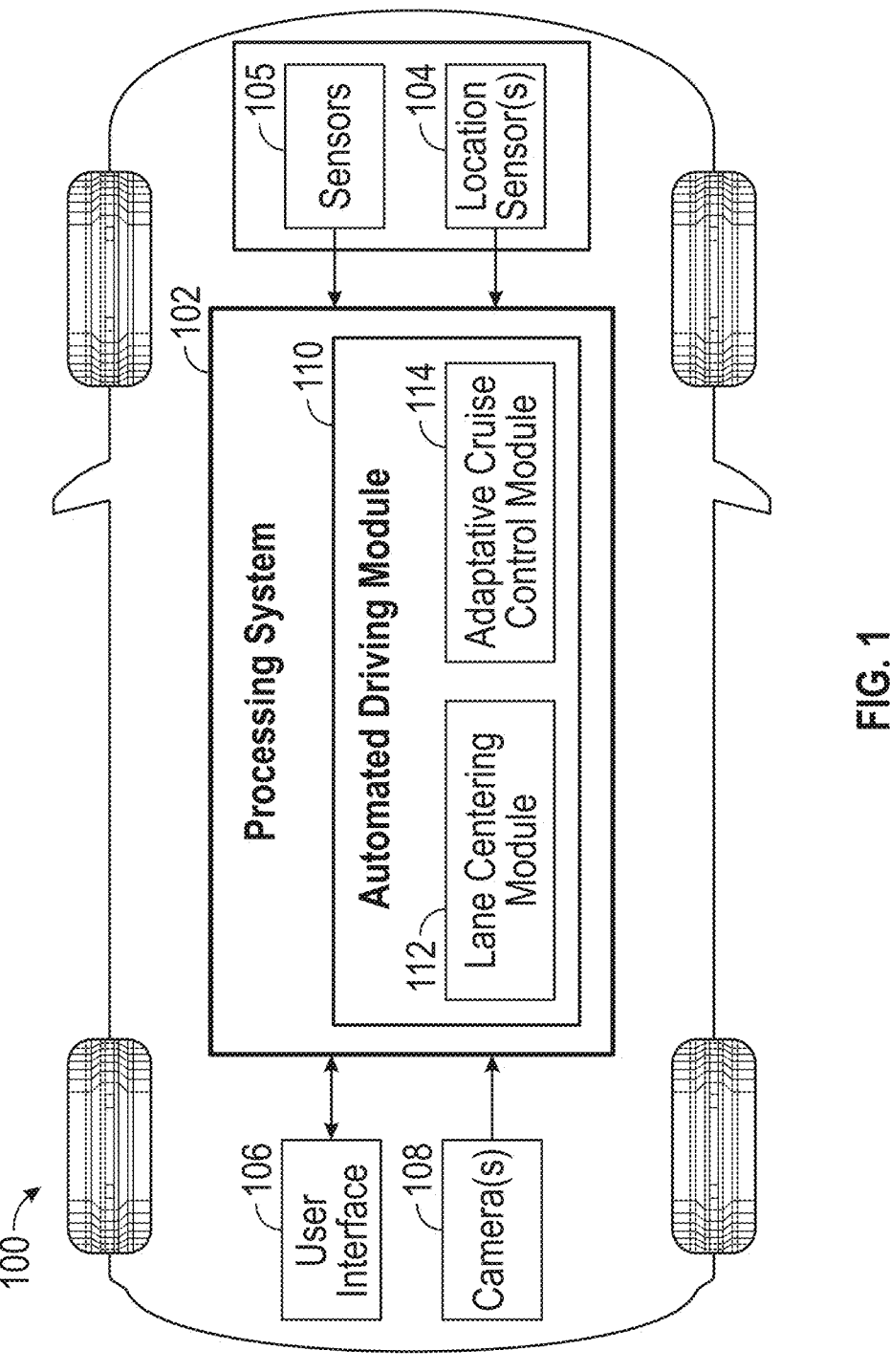
FIG. 1 illustrates a vehicle having a processing system that includes an automated driving module with lane centering and adaptive cruise control functionalities.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Modern transportation technologies have introduced advanced features aimed at enhancing driving safety and convenience. These features assist or take over certain driving tasks, offering functionalities such as lane keep assist, adaptive cruise control, and fully autonomous operation. Despite these advancements, user confusion regarding the operation and conditions for utilizing these features limits their adoption and effective use.

Current systems often operate with distinct operational requirements and limitations. Some systems rely on high-definition maps and geofencing to ensure safe operation, while others depend on real-time data inputs to maintain lane positioning. The lack of integration between these operational modes can lead to user uncertainty and reduced system usability, particularly when transitioning between different driving environments.

Existing automated driving systems face several disadvantages. Systems that rely solely on high-definition maps and geofencing may not function effectively in areas where such maps are unavailable, limiting their operational scope. Conversely, systems that depend on real-time data inputs, such as camera-based lane detection, may struggle in adverse weather conditions or environments with poor lane markings. This dichotomy results in inconsistent user experiences and can diminish driver confidence in the system's reliability.

Another significant drawback of current systems is the lack of seamless transition between different operational modes. Drivers may find the system challenging to understand when and how to switch between hands-on and hands-off modes, leading to reduced feature utilization. Additionally, the absence of a unified engagement strategy and clear communication regarding system status further complicates the user experience.

In accordance with an exemplary embodiment, an automated driving system with integrated hands-on and hands-off modes is provided. The automated driving system addresses these issues by integrating hands-on and hands-off operational modes into a single, cohesive feature. In exemplary embodiments, the automated driving system employs a streamlined button press strategy and an automatic engagement mechanism to maximize usability and ensure smooth transitions between modes. The automated driving system automatically engages the appropriate mode based on geofencing, sensor availability, customer selection, and sensor statuses, while continuously communicating the feature status to the driver. Furthermore, the automated driving system includes a novel method to quantify the driver's understanding of the feature, generating adaptive messages to enhance driver comprehension and prevent mode confusion.

FIG. 1 shows a vehicle 100 equipped with a processing system 102 that includes an automated driving module 110 for controlling the integration of hands-on and hands-off driving modes. The processing system 102 interfaces with various components to facilitate the automated driving functionalities. The automated driving module 110 within the processing system 102 comprises a lane centering module 112 and an adaptive cruise control module 114. The lane centering module 112 is responsible for maintaining the vehicle's position within the lane, while the adaptive cruise control module 114 manages the vehicle's speed and distance relative to other vehicles.

The vehicle 100 includes a user interface 106 that allows the driver to interact with the automated driving system. The user interface 106 communicates with the processing system 102 to provide the driver with information about the current driving mode and any necessary actions. The user interface 106 also include one or more user inputs that can be used to selectively activate and deactivate various systems such as the automated driving system and an adaptive cruise control system.

Camera(s) 108 are integrated into the vehicle 100 to capture real-time data about the vehicle's surroundings. The camera(s) 108 send this data to the processing system 102, which uses the data to make informed decisions about lane positioning and other driving tasks. Additionally, the camera(s) 108 monitors the driver to ensure attentiveness and compliance with the system's requirements for hands-on and hands-off modes.

Location sensor(s) 104 provides the vehicle 100 with precise location information. This data is necessary for the automated driving module 110 to determine whether the vehicle is on a mapped or unmapped road, which influences the transition between hands-on and hands-off modes. Sensors 105 monitor various aspects of the vehicle's environment and the driver's behavior. These sensors 105 send data to the processing system 102 to ensure the driver remains attentive and to facilitate smooth transitions between driving modes.

Figure 2:
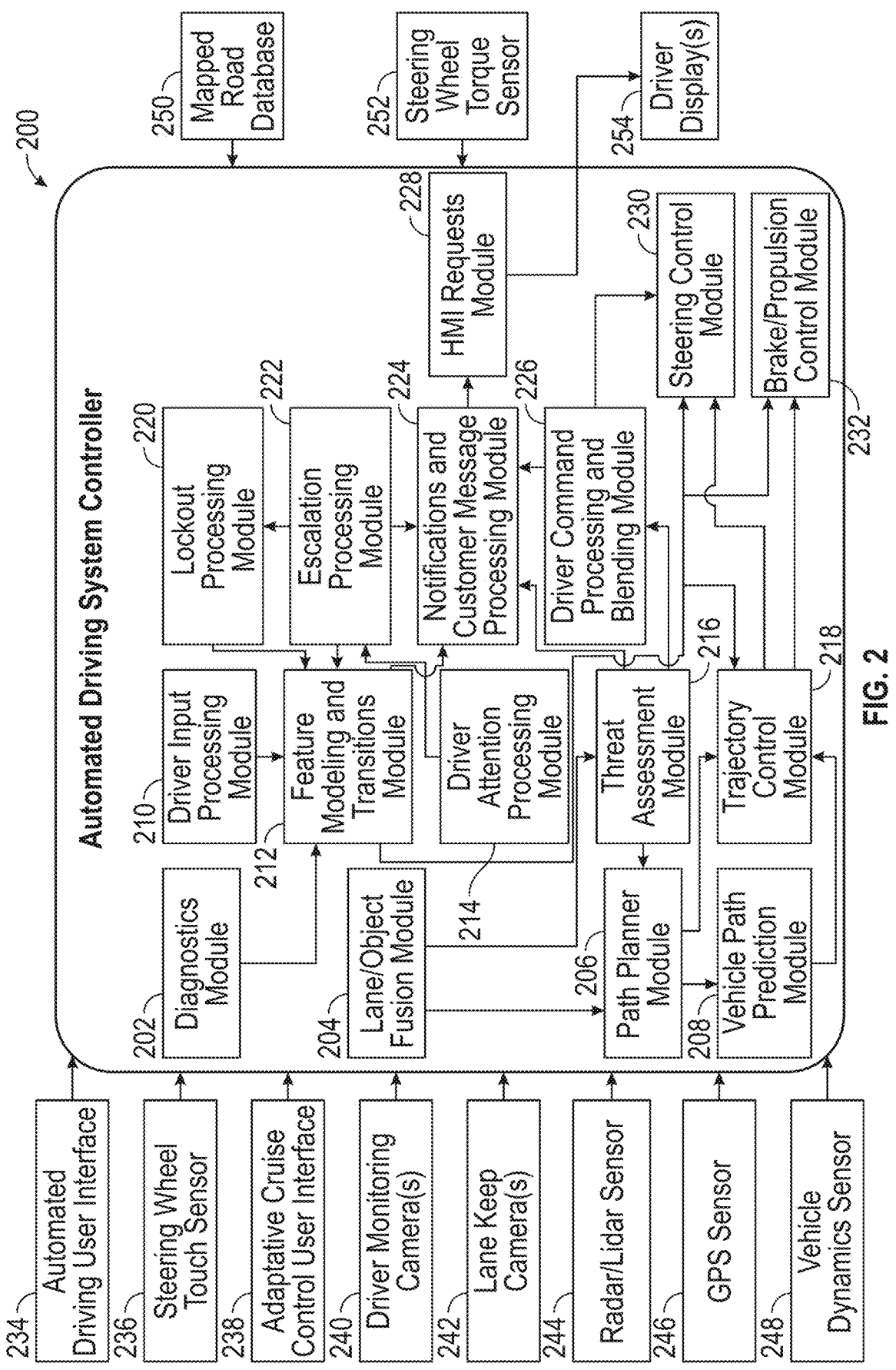
FIG. 2 illustrates a block diagram illustrating one embodiment of an automated driving system controller for managing integrated hands-on and hands-off driving modes.

Referring now to FIG. 2, an automated driving system controller 200 in accordance with an exemplary embodiment is shown. In exemplary embodiments, the automated driving system controller 200 serves as the central processing unit for the automated driving system. The automated driving system controller 200 interfaces with various modules and sensors to manage the integration of hands-on and hands-off driving modes. The automated driving system controller 200 processes data from these modules and sensors to make real-time decisions regarding vehicle control and driver interaction.

In exemplary embodiments, the automated driving system controller 200 includes a diagnostics module 202, a lane/object fusion module 204, a path planner module 206, a vehicle path prediction module 208, a driver input processing module 210, feature modeling and transitions module 212, a driver attention processing module 214, a threat assessment module 216, a trajectory control module 218, a lockout processing module 220, an escalation processing module 222, a notifications and customer message processing module 224, a driver command processing and blending module 226, a HMI requests module 228, a steering control module 230 and a brake/propulsion control module 232 that together execute the functionality of the automated driving system. The automated driving system controller 200 is configured to receive input from various sources which include, but are not limited to an automated driving user interface 234, a steering wheel touch sensor 236, an adaptive cruise control user interface 238, a driver monitoring camera(s) 240, a lane keep camera(s) 242, a radar/lidar sensor 244, a GPS sensor 246, a vehicle dynamics sensor 248, a mapped road database 250, a steering wheel torque sensor 252, and a driver display(s) 254.

In exemplary embodiments, the diagnostics module 202 is configured to monitor the health and status of the components of the automated driving system. The diagnostics module 202 performs self-checks and diagnostics to ensure all components of the automated driving system are functioning correctly. The diagnostics module 202 sends alerts to the automated driving system controller 200 if any issues are detected, enabling timely maintenance and troubleshooting.

In exemplary embodiments, the lane/object fusion module 204 is configured to combine data from various sensors, including cameras and radar/lidar sensors 244. The lane/object fusion module 204 processes this data to create a comprehensive understanding of the vehicle's surroundings, including lane markings and nearby objects. The lane/object fusion module 204 sends this fused data to the path planner module 206 and other relevant modules for further processing.

In exemplary embodiments, the path planner module 206 receives data from the lane/object fusion module 204. The path planner module 206 uses the fused data to generate a safe and efficient trajectory for the vehicle. The path planner module 206 considers factors such as lane positioning, road curvature, and surrounding traffic to plan the vehicle's path. The path planner module 206 sends the planned trajectory to the vehicle path prediction module 208 and to the trajectory control module 218. In exemplary embodiments, the vehicle path prediction module 208 interfaces with the path planner module 206 and is configured to predict the vehicle's future path based on the planned trajectory and current vehicle dynamics. The vehicle path prediction module 208 sends this predicted path to the trajectory control module 218 for execution.

In exemplary embodiments, the driver input processing module 210 is configured to receive and process inputs from the driver. The driver input processing module 210 interprets commands such as steering, braking, and acceleration. The driver input processing module 210 sends these commands to the relevant control modules, such as the steering control module 230 and the brake/propulsion control module 232, ensuring the driver's inputs are accurately reflected in the vehicle's behavior.

In exemplary embodiments, the feature modeling and transitions module 212 is configured to manage the transition between hands-on and hands-off modes. The feature modeling and transitions module 212 considers factors such as geofencing, sensor availability, and driver preferences to determine the appropriate mode. The feature modeling and transitions module 212 sends mode transition commands to the relevant modules and communicates the current mode to the driver via driver display(s) 254.

In exemplary embodiments, the driver attention processing module 214 is configured to monitor the driver's attentiveness. The driver attention processing module 214 uses data from the driver monitoring camera(s) 240 to assess the driver's eye gaze and head pose. The driver attention processing module 214 sends alerts to the escalation processing module 222 if the driver is not paying attention, triggering appropriate escalation actions. In addition, the driver attention processing module 214 may be configured to obtain data from the steering wheel touch sensor 236 to determine whether one or more hands of the driver are disposed on the steering wheel.

In exemplary embodiments, the threat assessment module 216 is configured to evaluate potential hazards in the vehicle's environment. The threat assessment module 216 processes data from the lane/object fusion module 204 and other sensors to identify threats such as obstacles, pedestrians, and other vehicles. The threat assessment module 216 sends threat information to the trajectory control module 218 and the driver command processing and blending module 226 for appropriate responses.

In exemplary embodiments, the trajectory control module 218 receives data from the vehicle path prediction module 208 and may execute the predicted path from the path planner module 206, depending on the feature status, by sending control commands to the steering control module 230 and the brake/propulsion control module 232. In exemplary embodiments, the steering commands are generated such that the predicted path of the vehicle follows the planned path in the future steps. The trajectory control module 218 ensures the vehicle follows the planned trajectory while maintaining safety and comfort.

In exemplary embodiments, the lockout processing module 220 is configured to manage feature lockouts. The lockout processing module 220 activates lockouts if the driver fails to respond to escalation prompts or if system diagnostics detect issues. The lockout processing module 220 sends lockout commands to the relevant modules, disabling the automated driving features for the remainder of the cycle. In exemplary embodiments, the escalation processing module 222 connects to the driver attention processing module 214 and is configured to manage the escalation strategy for inattentive drivers. The escalation processing module 222 sends alerts and prompts to the notifications and customer message processing module 224, ensuring the driver is aware of the need to take control or pay attention.

In exemplary embodiments, the notifications and customer message processing module 224 is configured to manage communication with the driver. The notifications and customer message processing module 224 generates messages and alerts based on system status, mode transitions, and driver attentiveness. The notifications and customer message processing module 224 sends these messages to the driver display(s) 254 and other human machine interface (HMI) components. For example, the other HMI interfaces may include status lights on the dashboard or disposed within the steering wheel that indicate the operating mode of the automated driving system.

In exemplary embodiments, the driver command processing and blending module 226 receives data from to the driver input processing module 210 and is configured to blend driver commands with automated control inputs to ensure smooth and safe vehicle operation. The driver command processing and blending module 226 sends blended commands to the relevant control modules. An example of a blended command in an automated driving system is when the driver initiates a lane change by activating the turn signal, and the system combines this input with its own lane-keeping and adaptive cruise control functionalities to execute the maneuver smoothly. Specifically, the driver's turn signal input is processed by the driver input processing module 210, which then sends this command to the driver command processing and blending module 226. The blending module combines the driver's intent to change lanes with the system's real-time data on surrounding traffic, lane markings, and vehicle speed. The trajectory control module 218 then receives the blended command to adjust the vehicle's steering and speed, ensuring a safe and efficient lane change while maintaining the desired following distance and lane position.

In exemplary embodiments, the HMI requests module 228 interfaces with the automated driving system controller 200 to manage HMI requests. The HMI requests module 228 processes inputs from the driver and generates appropriate responses, such as mode transition prompts and system status updates and command to the driver. For example, the HMI requests module 228 may tell the driver to take control of the steering if they are in "hands on" mode and their hands are not on the steering wheel. The HMI requests module 228 sends these responses to the driver display(s) 254 and other HMI components. The other HMI components may include, but are not limited to, a steering wheel light bar, a heads-up display, haptic feedback, and audio alerts. For example, a light bar integrated into the steering wheel can provide visual cues to the driver about the current operational mode of the automated driving system.

In exemplary embodiments, the steering control module 230 connects to the trajectory control module 218 and is configured to execute steering commands to maintain the vehicle's lane position and follow the planned trajectory. The steering control module 230 sends feedback to the trajectory control module 218 to ensure accurate control. In exemplary embodiments, the brake/propulsion control module 232 interfaces with the trajectory control module 218 and is configured to manage the vehicle's speed and acceleration by controlling the braking and propulsion systems. The brake/propulsion control module 232 ensures the vehicle follows the planned trajectory while maintaining safety and comfort.

In exemplary embodiments, the automated driving user interface 234 connects to the automated driving system controller 200 and provides the driver with a means to interact with the automated driving system. In exemplary embodiments, the automated driving user interface 234, includes a single button to activate and deactivate the automated driving system. The use of a single button simplifies the driver's interaction with the automated driving system. This streamlined design reduces complexity and minimizes the potential for user error, making it easier for drivers to engage and disengage the system. By consolidating multiple functions into a single button, the interface enhances usability and ensures that drivers can quickly and intuitively operate the automated driving features, thereby improving overall safety and user experience.

In exemplary embodiments, the steering wheel touch sensor 236 interfaces with the driver input processing module 210 and the automated driving system controller 200. In one embodiment, the steering wheel touch sensor 236 is a capacitive sensor that detects whether the driver has one or more hands on the steering wheel. The steering wheel touch sensor 236 sends this information to the driver attention processing module 214 and the feature modeling and transitions module 212 to determine the appropriate mode and ensure driver attentiveness.

In exemplary embodiments, the adaptive cruise control user interface 238 connects to the automated driving system controller 200 and provides the driver with a means to interact with the adaptive cruise control system. The adaptive cruise control user interface 238 also allows the driver to input commands and preferences to control the adaptive cruise control system. The adaptive cruise control system allows the driver to input various commands to control the vehicle's speed and following distance. These commands enhance the driving experience by providing greater control and convenience. The types of commands a driver may input into an adaptive cruise control system include a set speed command, an adjust speed command, a set following distance command, a resume speed command, and a cancel command. In addition, the driver can temporarily override the adaptive cruise control system by pressing the accelerator pedal. This allows the driver to accelerate beyond the set speed if necessary. Once the accelerator pedal is released, the adaptive cruise control system resumes control at the previously set speed.

In exemplary embodiments, the driver monitoring camera(s) 240 interface with the driver attention processing module 214 and the automated driving system controller 200. The driver monitoring camera(s) 240 are configured to capture real-time data about the driver's eye gaze and head pose. The driver monitoring camera(s) 240 sends this data to the driver attention processing module 214 to assess the driver's attentiveness and compliance with the system's requirements.

In exemplary embodiments, the lane keep camera(s) 242 provides data to the lane/object fusion module 204 and the automated driving system controller 200. The lane keep camera(s) 242 captures real-time data about the vehicle's surroundings, including lane markings and nearby objects. The lane keep camera(s) 242 sends this data to the lane/object fusion module 204 for processing and fusion with other sensor data. In exemplary embodiments, the radar/lidar sensor 244 interfaces with the lane/object fusion module 204 and the automated driving system controller 200. The radar/lidar sensor 244 captures real-time data about the vehicle's surroundings, including objects and obstacles. The radar/lidar sensor 244 sends this data to the lane/object fusion module 204 for processing and fusion with other sensor data.

In exemplary embodiments, the GPS sensor 246 connects to the automated driving system controller 200 and provides precise location information. The GPS sensor 246 sends this data to the feature modeling and transitions module 212 and the path planner module 206 to determine whether the vehicle is on a mapped or unmapped road, influencing the transition between hands-on and hands-off modes. In exemplary embodiments, the vehicle dynamics sensor 248 interfaces with the automated driving system controller 200 and provides data about the vehicle's dynamics, such as speed, acceleration, and yaw rate. The vehicle dynamics sensor 248 sends this data to the vehicle path prediction module 208 and the trajectory control module 218 to ensure accurate control and prediction of the vehicle's path.

In exemplary embodiments, the mapped road database 250 connects to the automated driving system controller 200 and provides high-definition map data for geofenced roads. The mapped road database 250 sends this data to the feature modeling and transitions module 212 and the path planner module 206 to determine the appropriate mode and plan the vehicle's path on mapped roads.

In exemplary embodiments, the steering wheel torque sensor 252 interfaces with the driver input processing module 210 and the automated driving system controller 200. The steering wheel torque sensor 252 detects the amount of torque applied by the driver to the steering wheel. The steering wheel torque sensor 252 sends this data to the driver input processing module 210 to interpret the driver's steering commands and ensure accurate control.

In exemplary embodiments, the driver display(s) 254 connects to the notifications and customer message processing module 224 and the automated driving system controller 200. The driver display(s) 254 provides visual feedback to the driver about the system status, mode transitions, and other relevant information. The driver display(s) 254 ensure the driver is informed and aware of the current driving conditions and any necessary actions. In exemplary embodiments, the driver display(s) 254 in the automated driving system uses various messages and icons to communicate the current operating mode and transitions between operating modes to the driver. These visual cues ensure that the driver is well-informed about the system's status and can respond appropriately. The messages and icons may include a hands-on mode icon, which is icon of a steering wheel with hands disposed on it indicates that the system is in hands-on mode. The hands-on mode icon informs the driver that they need to keep their hands on the steering wheel and that the system is providing lane centering and speed regulation assistance. The messages and icons may also include a hands-off mode icon, which is an icon of a steering wheel without hands disposed on it indicates that the system is in hands-off mode. The hands-off mode icon informs the driver that they can safely remove their hands from the steering wheel, and the system will control the vehicle's trajectory and speed.

The messages, icons, and other interfaces, such as a lightbar disposed in the steering wheel, may be used to indicated transitions between hands-on and hands-off modes. The icons and messages may include a transition to hands-on mode icon, which is a red icon of a steering wheel with hands disposed on it, accompanied by a textual message such as "Transitioning to Hands-On Mode," alerts the driver that the system is switching from hands-off to hands-on mode. This transition may occur when the vehicle exits a geofenced area or when sensor availability changes. The messages and icons may include a transition to hands-off mode icon, which is a green icon of a steering wheel without hands disposed on it, accompanied by a textual message such as "Transitioning to Hands-Off Mode," to inform the driver that the system is switching from hands-on to hands-off mode. This transition may occur when the vehicle enters a geofenced area where hands-off mode is available.

The messages and icons may include a standby mode indication, which may be a yellow, white, or gray icon or message such as "System in Standby Mode" indicates that the automated driving system is in standby mode. This may occur when the adaptive cruise control (ACC) is not available, and the system is awaiting activation. The messages and icons may include a unavailability messages, which are textual messages such as "Hands-off Mode Unavailable" or "Hands-On Mode Required" inform the driver about the unavailability of a specific mode. These messages may be accompanied by icons indicating the current mode and the reason for unavailability.

In exemplary embodiments, the automated driving system is configured to generate adaptive messages based on the driver's interactions with the features of the automated driving system. For example, if the driver consistently shows a correct understanding of the lane centering state, the system may reduce the frequency of mode transition messages. Conversely, if the driver shows a wrong understanding, the system may increase the frequency of instructional messages. These messages and icons work together to provide clear and intuitive communication to the driver, enhancing the overall safety and usability of the automated driving system.

Figure 3:
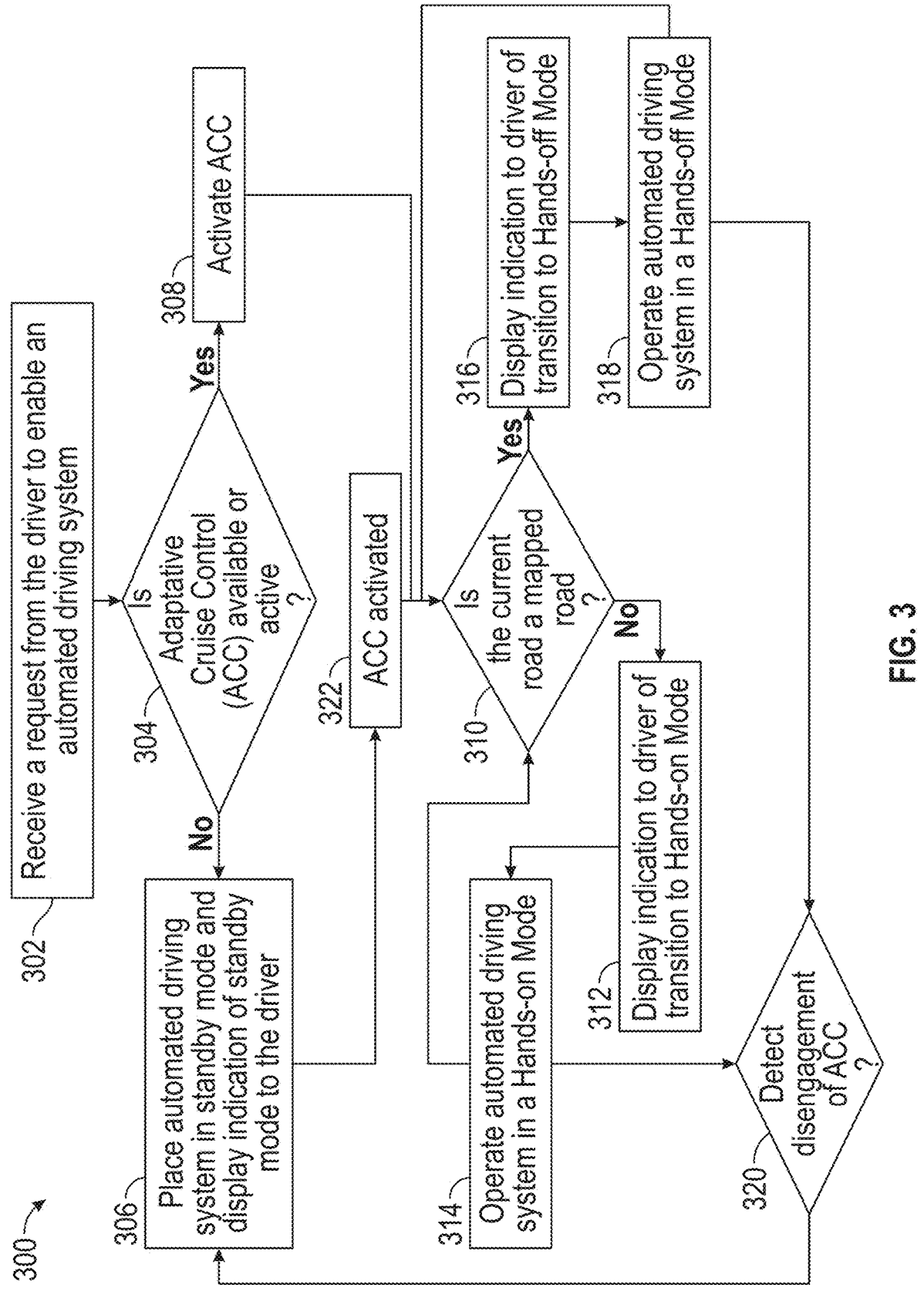
FIG. 3 illustrates a flowchart diagram of a method for operating an automated driving system with integrated hands-on and hands-off modes.

Referring now to FIG. 3, a flowchart of a method 300 for operating an automated driving system of a vehicle is shown. The method 300 may be performed by the automated driving system controller 200 shown in FIG. 2 or the processing system 102 shown in FIG. 1. The method 300 is configured to ensure seamless integration of hands-on and hands-off modes of the automated driving system. At block 302, method 300 includes receiving a request from the driver to enable the automated driving system. In exemplary embodiments, the request enables the automated driving system and initiates the process of determining the appropriate operational mode based on various factors such as the availability of adaptive cruise control (ACC) and the type of road the vehicle is on.

At decision block 304, the method 300 includes determining whether the adaptive cruise control (ACC) is available or active. If the ACC is not available, the method 300 proceeds to block 306 and places the automated driving system in standby mode and displays an indication of standby mode to the driver. This ensures that the driver is aware of the system's status and can take appropriate actions if necessary. Once the ACC is activated at block 308, the method 300 proceeds to decision block 310 and determines whether the current road is a mapped road. As used herein, a mapped road is a road that has been pre-scanned and digitally mapped using high-definition mapping technologies such as LIDAR (Light Detection and Ranging). These maps contain detailed information about the road's geometry, lane markings, traffic signs, and other relevant features. In the context of automated driving systems, a mapped road provides the vehicle with precise and reliable data, enabling more accurate and safe operation of hands-off driving modes. The high-definition map serves as a reference for the vehicle's sensors and control systems, allowing for better decision-making and navigation.

Based on a determination that the vehicle is located on a mapped road, the method proceeds to block 316 and displays an indication to the driver of a transition to a hands-off operating mode. In one embodiment, the indication may include displaying a textual message to the driver via a display. In another embodiment, the indication may include displaying an icon of a steering wheel without hands disposed on the steering wheel. Next, at block 318, the method 300 includes operating the automated driving system in the hands-off operating mode. The transition to the hand-off operating mode indicates to the driver that they may safely remove their hands from the steering wheel, relying on the automated driving system to control the vehicle's trajectory and speed.

Based on a determination that the vehicle is not located on a mapped road, the method 300 proceeds to block 312 and displays an indication to the driver of a transition to a hands-on operating mode. In one embodiment, the indication may include displaying a textual message to the driver via a display. In another embodiment, the indication may include displaying an icon of a steering wheel with hands disposed on the steering wheel. Next, at block 314, the method 300 operates the automated driving system in the hands-on operating mode. In this mode, the driver keeps their hands on the steering wheel, and the automated driving system provides assistance with lane centering and speed regulation.

In exemplary embodiments, the method 300 includes continuously monitoring the location of the vehicle and the status of the ACC. If, at decision block 320, disengagement of the ACC is detected, the method proceeds to block 306 and deactivates the automated driving features and returns control to the driver. Once the ACC is reactivated at block 322, the method 300 resumes the appropriate operational mode based on whether the current road is a mapped road and sensor data.

In exemplary embodiments, the automated driving system is configured to monitor the position of one or more hands of the driver while in the hands-off operating mode. If the automated driving system detects that the driver's hands are disposed on the steering wheel for a certain period of time, the automated driving system provides a message to the driver that operating the vehicle in a hands-off manner is safe. Additionally, the system may vibrate or nudge the steering wheel to alert the driver that they can safely remove their hands from the steering wheel.

In exemplary embodiments, the automated driving system is configured to monitor the location of the vehicle while in the hands-on operating mode. If the vehicle transitions to a mapped road, the automated driving system displays an indication to the driver of the transition to the hands-off operating mode and operates the automated driving system in the hands-off operating mode. Conversely, if the vehicle transitions to an unmapped road while in the hands-off operating mode, the automated driving system displays an indication to the driver of the transition to the hands-on operating mode and operates the automated driving system in the hands-on operating mode. In order to transition from the hands-off operating mode to the hands-on operating mode, the automated driving system must determine that the driver is ready to take control of the vehicle.

In exemplary embodiments, the automated driving system uses specific icons to communicate the current operational mode to the driver and to indicate a transition between operational modes to the driver. For example, the indication to the driver of the transition from the hands-off operating mode to the hands-on operating mode includes displaying a red icon of a steering wheel with hands disposed on the steering wheel. The indication to the driver of the transition to the hands-off operating mode includes displaying an icon of a steering wheel without hands disposed on the steering wheel. The system also displays an icon that indicates the operating mode of the automated driving system to ensure the driver is aware of the current mode.

In exemplary embodiments, the automated driving system includes a feature to monitor the attentiveness of the driver while the automated driving system is in one of the hands-off operation mode and the hands-on operating mode. If the automated driving system determines that the level of attentiveness of the driver is less than a threshold level, the automated driving system displays a request for the driver to take control of the vehicle. If the driver's attentiveness increases above the threshold level during a specified time period, the automated driving system allows the vehicle to continue operation in the current mode. However, if the driver's attentiveness does not increase above the threshold level, the automated driving system disables the automated driving system for the remainder of the operating cycle of the vehicle.

Figures 4A, 4B:
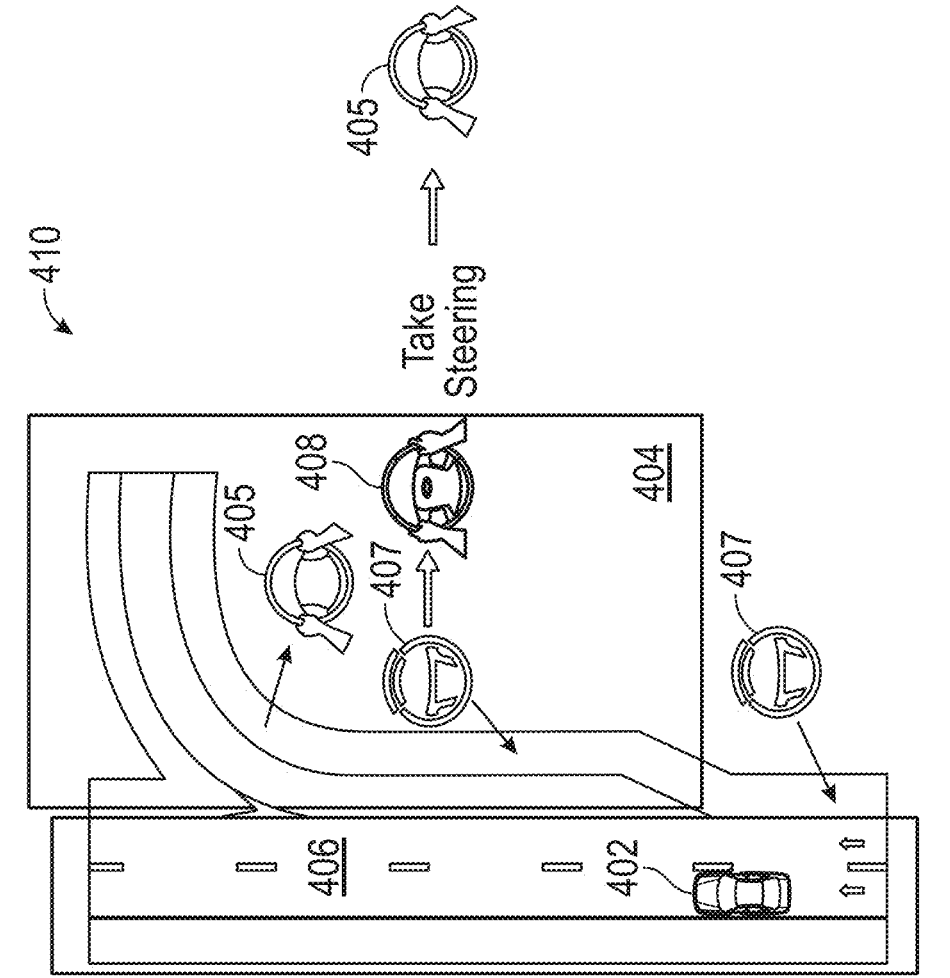
FIG. 4A illustrates a transition from hands-on to hands-off mode when entering a mapped road.
FIG. 4B illustrates a transition from hands-off to hands-on mode when exiting a mapped road.

Referring now to FIG. 4A, a schematic 400 illustrating a transition from hands-on to hands-off mode when entering a mapped road is shown. As illustrated, a vehicle 402 is transitioning from an unmapped road 404 to a mapped road 406. While the vehicle 402 is operating on the unmapped road 404, a hands-on icon 405 is displayed to the driver of the vehicle. The hands-on icon 405 is an icon illustrating a steering wheel with hands placed on the steering wheel. While the vehicle 402 is operating on the mapped road 406, a hands-off icon 407 is displayed to the driver of the vehicle.

The hands-off icon 407 is an icon illustrating a steering wheel without hands placed on the steering wheel.

Referring now to FIG. 4B, a schematic 410 illustrating a transition from hands-off to hands-on mode when exiting a mapped road is shown. The automated driving system displays the hands-off icon 407 when the vehicle 402 is on the mapped road 406, indicating that the driver can operate in hands-off mode. As the vehicle 402 transitions to the unmapped road 404, the automated driving system displays a take the steering wheel icon 408, prompting the driver to place their hands on the steering wheel. The take the steering wheel icon 408 is an icon illustrating a steering wheel without hands placed on the steering wheel. In exemplary embodiments, the take the steering wheel icon 408 is the icon as the hands-on icon 405, but the color of the icons are different. For example, the hands-on icon 405 may be green and the take the steering wheel icon 408 may be red. Once the vehicle 402 is on the unmapped road 404, the automated driving system displays the hands-on icon 405, indicating that the driver keeps their hands on the steering wheel.

Figure 4C:
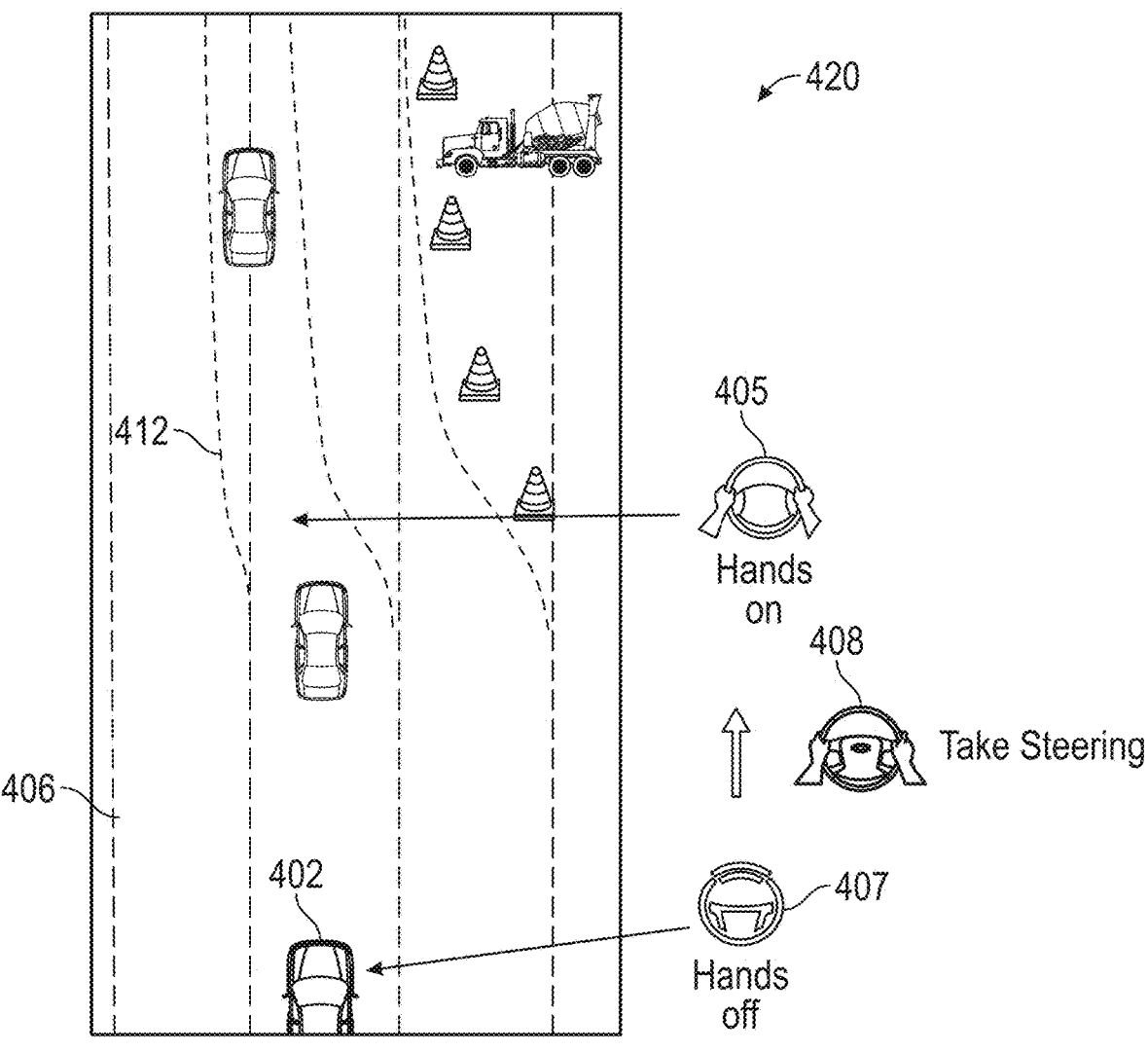
FIG. 4C illustrates a scenario where the automated driving system transitions from hands-off to hands-on mode due to road construction.

Referring now to FIG. 4C, a schematic 420 illustrating a scenario where the automated driving system transitions from hands-off to hands-on mode due to road construction. The vehicle 402 is located on a mapped road 406 and accordingly the automated driving system of the vehicle 402 operates in a hands-off mode and displays a hands-off icon 407. During operation, the sensors of the vehicle detect a lane line deviation 412, which is a deviation in the lane markings from expected lane markings, such as due to road construction. The detection of the lane line deviation 412 prompts a transition in the operational mode of the vehicle 402 from the hands-off mode to the hands-on mode. During this transition, the automated driving system displays a take the steering wheel icon 408, prompting the driver to place their hands on the steering wheel. Once the vehicle enters the hand-on mode, the automated driving system displays the hands-on icon 405.

Figures 5A, 5B:
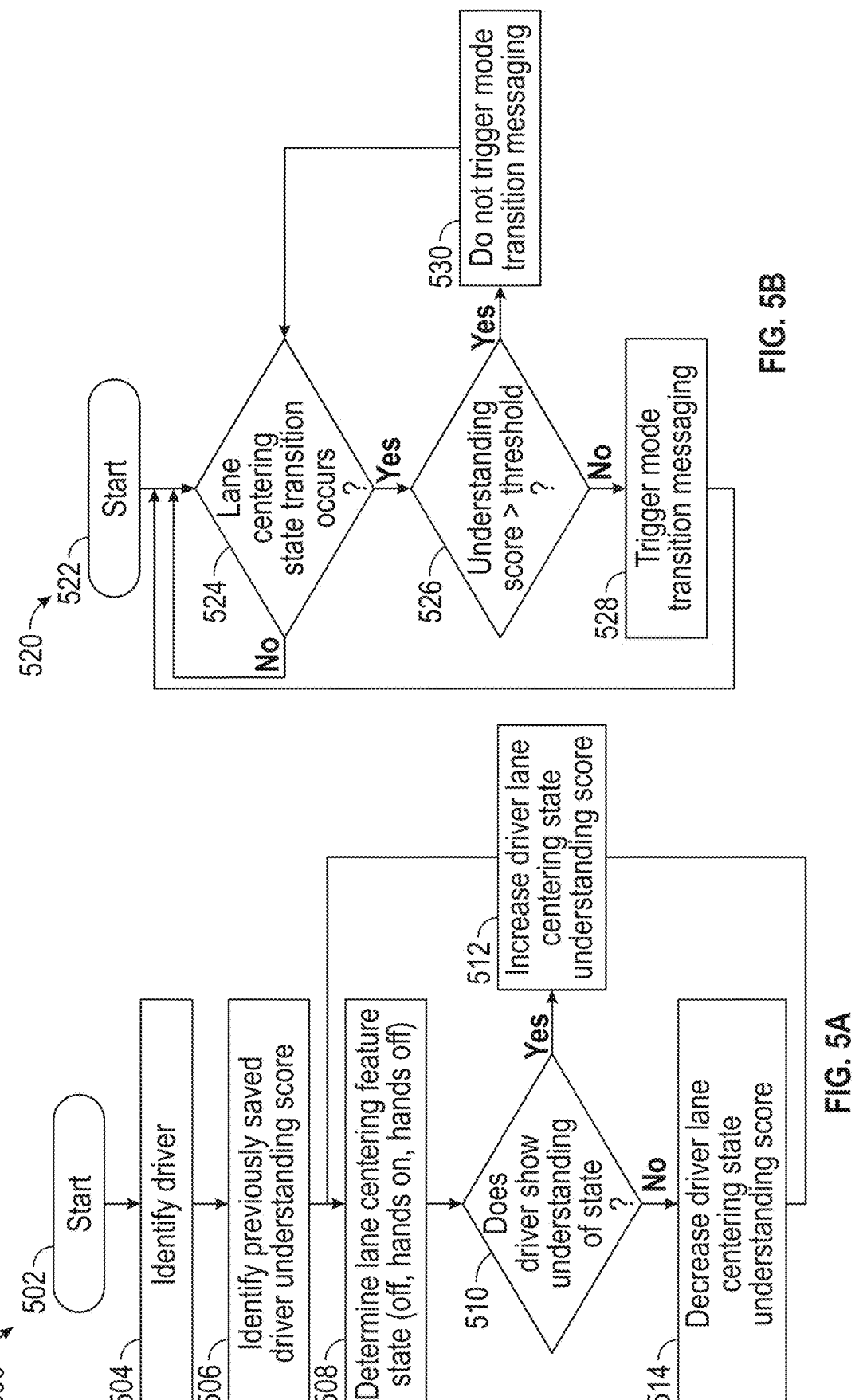
FIG. 5A illustrates a flowchart diagram of a method for determining and adjusting a driver's lane centering state understanding score.
FIG. 5B illustrates a flowchart diagram of a method for determining whether to trigger mode transition messaging based on lane centering state transitions and a driver's understanding score.

Referring now to FIG. 5A, a flowchart diagram of a method 500 for determining and adjusting a driver's lane centering state understanding score is shown. The method 500 can be implemented by an automated driving system to assess and enhance the driver's comprehension of lane centering states. At block 502, the method 500 starts. This initiation step involves activating the automated driving system's feature understanding evaluation module to begin assessing the driver's comprehension of lane centering states.

At block 504, the method 500 identifies the driver. This can be performed using biometric data such as facial recognition or fingerprint scanning, or by selecting the driver's profile from a list of saved profiles in the system. At block 506, the method 500 identifies the previously saved driver understanding score. This involves retrieving the driver's historical feature understanding score from the system's database, which reflects their past interactions and proficiency with the lane centering feature. At block 508, the method 500 determines the lane centering feature state, which can be off, hands-on, or hands-off. For example, the system checks the current operational mode of the lane centering feature based on sensor data and the vehicle's environment. If the vehicle is on a mapped road, the system may determine that the hands-off mode is active.

Next, at block 510, the method 500 determines whether the driver shows an understanding of the lane centering state. This can be assessed by monitoring the driver's actions and responses. For instance, if the system is in hands-off mode and the driver correctly removes their hands from the steering wheel, it indicates an understanding of the state. If the driver shows an understanding of the state, the method 500 proceeds to block 512 and increases the driver lane centering state understanding score. For example, the system may add points to the driver's score for correctly transitioning to hands-off mode when prompted. If the driver does not show an understanding of the state, the method 500 proceeds to block 514 and decreases the driver lane centering state understanding score. For instance, if the driver fails to take control of the steering wheel when the system transitions to hands-on mode, the system may deduct points from the driver's score.

Referring now to FIG. 5B, a flowchart diagram of a method 520 for determining whether to trigger mode transition messaging based on lane centering state transitions and a driver's understanding score is shown. The method 520 can be implemented by an automated driving system to decide when to provide mode transition messages to the driver. At block 522, the method 520 starts. This initiation step involves activating the automated driving system's mode transition evaluation module to begin monitoring lane centering state transitions.

At block 524, the method 520 determines whether a lane centering state transition occurs. This can be performed by analyzing sensor data to detect changes in the vehicle's operational mode. For example, the system checks if the vehicle is transitioning from hands-on to hands-off mode or vice versa. If no lane centering state transition occurs, the method 520 loops back to block 524 to continue monitoring. If a lane centering state transition occurs, the method 520 proceeds to block 526 and determines whether the understanding score is greater than a threshold. This involves comparing the driver's feature understanding score, retrieved from the system's database, to a predefined threshold value. For instance, if the threshold is set at 70 and the driver's score is 75, the score is considered greater than the threshold. If the understanding score is greater than the threshold, the method 520 proceeds to block 530 and does not trigger mode transition messaging. This means that the system recognizes the driver's proficiency and refrains from displaying additional messages, thereby reducing unnecessary distractions. If the understanding score is not greater than the threshold, the method 520 proceeds to block 528 and triggers mode transition messaging. For example, if the driver's score is 65, which is below the threshold, the system generates and displays messages to guide the driver through the transition, ensuring they understand the change in operational mode.

In exemplary embodiments, the automated driving system incorporates a methodology designed to intuitively communicate the underlying reasons for the unavailability of certain features to the customer. This approach ensures that drivers are well-informed about why specific operational modes, such as hands-off driving, may not be available at any given time. When the hands-off mode is engaged and subsequently becomes unavailable, the automated driving system automatically displays the reason for this unavailability to the driver. This immediate feedback helps the driver understand the conditions affecting the system's performance, such as sensor malfunctions, adverse weather conditions, or the vehicle exiting a geofenced area. By providing this information in real-time, the system enhances transparency and helps build driver trust in the automated driving features.

Additionally, the automated driving system offers a proactive way for drivers to check the availability status of the hands-off mode even when it is not engaged. By long pressing the lane centering button, the driver can access Human-Machine Interface (HMI) messages that detail the reasons for the unavailability of the hands-off mode. This feature allows drivers to understand potential issues before attempting to engage the hands-off mode, thereby preventing confusion and frustration. The HMI messages are designed to be clear and concise, providing actionable information that the driver can use to address any issues, such as cleaning sensors or ensuring that the vehicle is on a mapped road. This intuitive communication strategy not only improves the user experience but also maximizes the usability and safety of the automated driving system.

The automated driving system includes an adaptive messaging system designed to enhance driver understanding and interaction with the automated driving features. This system generates adaptive messages based on the driver's historical interactions and comprehension of the system's functionalities. By continuously monitoring the driver's behavior and responses, the system computes a feature understanding score that reflects the driver's familiarity and proficiency with the automated driving modes. This score takes into account various factors such as the driver's actions, response times, and the maximum level of autonomy they have utilized. The adaptive messaging system uses this score to tailor its communication strategy, ensuring that the messages are relevant and helpful to the driver.

For instance, during the initial phases of using the automated driving system, the driver may receive comprehensive instructions and frequent reminders to help them understand how to operate the system effectively. As the driver's feature understanding score improves, the system reduces the frequency and detail of the messages, focusing instead on providing concise updates and alerts. This adaptive approach prevents information overload and minimizes distractions, allowing the driver to become more comfortable and confident with the automated driving features. By customizing the messaging strategy based on the driver's level of understanding, the system maximizes usability, enhances safety, and ensures a more personalized and satisfying driving experience.

To illustrate the calculation of a feature understanding score, consider two drivers: Driver A, who understands the features of the automated driving system, and Driver B, who does not. Driver A consistently demonstrates a correct understanding of the automated driving system's features. For example, Driver A promptly transitions to hands-on mode when the system indicates that hands-off mode is unavailable. Driver A also responds quickly to alerts and follows the system's instructions accurately. Over a period of time, Driver A's actions, response times, and interactions with the system are monitored and recorded. The feature understanding score for Driver A is calculated based on these factors, resulting in a high score. For instance, Driver A might receive a score of 90 out of 100, indicating a strong understanding and proficiency in using the automated driving features. Driver B, on the other hand, frequently shows a lack of understanding of the system's features. For example, Driver B may fail to transition to hands-on mode when required, ignore alerts, or take longer to respond to the system's instructions. These behaviors are monitored and recorded over time. The feature understanding score for Driver B is calculated based on these interactions, resulting in a lower score. For instance, Driver B might receive a score of 50 out of 100, indicating a need for further guidance and training in using the automated driving features. The adaptive messaging system uses these scores to tailor its communication strategy. Driver A, with a high feature understanding score, receives fewer and less detailed messages, as they have demonstrated proficiency in using the system. Conversely, Driver B, with a lower score, receives more frequent and detailed messages to help improve their understanding and interaction with the automated driving system. This adaptive approach ensures that each driver receives the appropriate level of guidance, enhancing overall safety and usability.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for operating an automated driving system of a vehicle, the method comprising:

receiving a request from a driver of the vehicle to enable the automated driving system;

based on a determination that an adaptive cruise control system is available, activating the adaptive cruise control system;

based on a determination that the vehicle is located on a mapped road using high-definition map data for geofenced roads and that the adaptive cruise control system is active, displaying an indication to the driver of a transition to a hands-off operating mode of the automated driving system and operating the automated driving system in the hands-off operating mode; and based on a determination that the vehicle is not located on a mapped road and that the adaptive cruise control system is active, displaying an indication to the driver of a transition to a hands-on operating mode of the automated driving system and operating the automated driving system in the hands-on operating mode, wherein in the hands-on operating mode the automated driving system provides assistance with lane centering and speed regulation while monitoring a steering wheel touch sensor to detect whether one or more hands of the driver are disposed on a steering wheel.

2. The method of claim 1, further comprising placing the automated driving system in a standby mode and displaying indication of standby mode to the driver based on a determination that the adaptive cruise control system is not available.

3. The method of claim 1, further comprising monitoring a position of one or more hands of the driver while in the hands-off operating mode and based on detecting that the one or more hands of the driver are disposed on a steering wheel, providing a message to the driver that it is safe for the driver to operate the vehicle in a hands-off manner.

4. The method of claim 1, further comprising monitoring a position of one or more hands of the driver while in the hands-off operating mode and based on detecting that the one or more hands of the driver are disposed on a steering wheel, vibrating the steering wheel.

5. The method of claim 1, further comprising monitoring the location of the vehicle while in the hands-on operating mode and based on a determination that the vehicle has transitioned to a mapped road, as determined using high-definition map data for geofenced roads, displaying the indication to the driver of the transition to the hands-off operating mode of the automated driving system and operating the automated driving system in the hands-off operating mode.

6. The method of claim 1, further comprising monitoring the location of the vehicle while in the hands-off operating mode and based on a determination that the vehicle has transitioned to an unmapped road, as determined using high-definition map data for geofenced roads, displaying the indication to the driver of the transition to the hands-on operating mode of the automated driving system and operating the automated driving system in the hands-on operating mode.

7. The method of claim 6, wherein the indication to the driver of the transition from the hands-off operating mode to the hands-on operating mode includes displaying a red icon of a steering wheel with hands disposed on the steering wheel.

8. The method of claim 1, wherein the indication to the driver of the transition to the hands-off operating mode includes displaying an icon of a steering wheel without hands disposed on the steering wheel.

9. The method of claim 1, wherein the indication to the driver of the transition to the hands-on operating mode includes displaying an icon of a steering wheel with hands disposed on the steering wheel.

10. The method of claim 1, further comprising displaying to the driver of the vehicle an icon that indicates the operating mode of the automated driving system.

11. The method of claim 1, further comprising quantifying customer understanding of a feature of the automated driving system based on a history of driver interactions with the feature by computing a feature understanding score, wherein the feature understanding score is determined by analyzing driver actions, response times, and a maximum level of autonomy utilized by the driver.

12. The method of claim 11, further comprising implementing an adaptive messaging strategy to improve an understating of the driver of the automated driving system, prevent mode confusion, and maximize feature usability, wherein the adaptive messaging strategy tailors messages based on the feature understanding score and historical interactions with the feature.

13. The method of claim 1, wherein the request from the driver of the vehicle to enable the automated driving system consists of a single button press that instructs the automated driving system to selectively enable one or more of the hands-on and hands-off operation modes.

14. A vehicle comprising:
an automated driving controller, the automated driving controller being configured to:
receive a request from a driver of the vehicle to enable an automated driving system;
based on a determination that an adaptive cruise control system is available, activate the adaptive cruise control system;
based on a determination that the vehicle is located on a mapped road, using high-definition map data for geofenced roads and that the adaptive cruise control system is active, automatically upon the vehicle entering a geofenced mapped road segment, display an icon of a steering wheel without hands indicating a transition to a hands-off operating mode of the automated driving system and operate the automated driving system in the hands-off operating mode, and, in the hands-off operating mode, autonomously control lateral steering/trajectory and longitudinal speed/distance; and
based on a determination that the vehicle is not located on a mapped road and that the adaptive cruise control system is active, automatically upon the vehicle exiting the geofenced mapped road segment, display a red icon of a steering wheel with hands indicating a transition to a hands-on operating mode of the automated driving system and operate the automated driving system in the hands-on operating mode,
wherein in the hands-on operating mode the automated driving system provides assistance with lane centering and speed regulation while monitoring a steering wheel touch sensor to detect whether one or more hands of the driver are disposed on a steering wheel.

15. The vehicle of claim 14, wherein the automated driving controller is further configured to place the automated driving system in a standby mode and display indication of standby mode to the driver based on a determination that the adaptive cruise control system is not available.

16. The vehicle of claim 14, wherein the automated driving controller is further configured to monitor a position of one or more hands of the driver while in the hands-off operating mode and based on detecting that the one or more hands of the driver are disposed on a steering wheel, display a message to the driver that it is safe for the driver to operate the vehicle in a hands-off manner.

17. The vehicle of claim 14, wherein the automated driving controller is further configured to monitor a position of one or more hands of the driver while in the hands-off operating mode and based on detecting that the one or more hands of the driver are disposed on a steering wheel, vibrate the steering wheel.

18. The vehicle of claim 14, wherein the automated driving controller is further configured to monitor the location of the vehicle while in the hands-on operating mode and based on a determination that the vehicle has transitioned to a mapped road, display the indication to the driver of the transition to the hands-off operating mode of the automated driving system and operate the automated driving system in the hands-off operating mode.

19. The vehicle of claim 14, wherein the automated driving controller is further configured to monitor the location of the vehicle while in the hands-off operating mode and based on a determination that the vehicle has transitioned to an unmapped road, display the indication to the driver of the transition to the hands-on operating mode of the automated driving system and operate the automated driving system in the hands-on operating mode.

20. A method for operating an automated driving system of a vehicle, the method comprising:

receiving a request from a driver of the vehicle to enable the automated driving system;

monitoring a location of the vehicle to determine whether the vehicle is on a mapped road or an unmapped road;

monitoring a state of an adaptive cruise control system of the vehicle, wherein determining whether the vehicle is on a mapped road uses high-definition map data for geofenced roads;

automatically upon the vehicle entering a geofenced mapped road segment and based on a determination that the adaptive cruise control system of the vehicle is active, operating the automated driving system in a hands-off operating mode in which the automated driving system autonomously controls lateral steering/trajectory and longitudinal speed/distance; and automatically upon the vehicle exiting the geofenced mapped road segment and based on a determination that the adaptive cruise control system of the vehicle is active, operating the automated driving system in a hands-on operating mode, wherein in the hands-on operating mode the automated driving system provides assistance with lane centering and speed regulation while monitoring a steering wheel touch sensor to detect whether one or more hands of the driver are disposed on a steering wheel;

responsive to a disengagement or unavailability of the adaptive cruise control system, placing the automated driving system in a standby mode, displaying an indication of standby mode, deactivating automated driving features, and upon reactivation of the adaptive cruise control system resuming an appropriate one of the hands-off operating mode and the hands-on operating mode based on whether the vehicle is on the mapped road or the unmapped road;

monitoring driver attentiveness while the automated driving system is in one of the hands-off operating mode and the hands-on operating mode and, if a level of attentiveness of the driver is less than a threshold level, displaying a request for the driver to take control of the vehicle, and if the level of attentiveness of the driver increases above the threshold level during a specified time period after displaying the request for the driver to take control of the vehicle, allowing the vehicle to continue operation in the one of the hands-off operating mode and the hands-on operating mode, and if the level of attentiveness of the driver does not increase above the threshold level during the specified time period after displaying the request for the driver to take control of the vehicle, disabling the automated driving system for the remainder of a key cycle of the vehicle; and when the hands-off operating mode becomes unavailable, displaying a reason for unavailability and, responsive to a long press of a lane centering button, presenting HMI messages that detail causes of unavailability.

* * * * *